Dec. 22, 1964 P. KAPTEYN 3,162,786
CIRCUIT ARRANGEMENTS OF ELECTRONIC FLASH UNITS FOR PHOTOGRAPHIC PURPOSES
Filed July 3, 1961
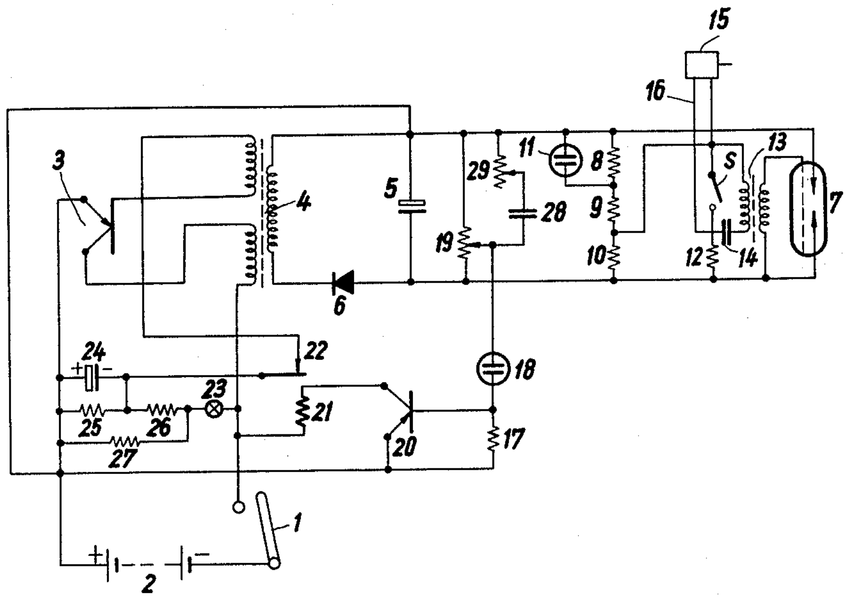
Jnventor:
Dr. Paul Kapteyn

United States Patent Office 3,162,786

Patented Dec. 22, 1964

3,162,786

CIRCUIT ARRANGEMENTS OF ELECTRONIC FLASH UNITS FOR PHOTOGRAPHIC PURPOSES

Paul Kapteyn, Berlin-Lichterfelde-Ost, Germany, assignor to Loewe Opta AG, Berlin, Germany, a company of Germany Filed July 3, 1961, Ser. No. 123,937

Claims priority, application Germany, July 9, 1960, L 36,537

3 Claims. (Cl. 315—241)

The invention refers to an advantageous circuit arrangement for electronic flash units with economy operation using a control circuit. Such "economy" or "battery conserving" circuits for electronic flash units are already known, wherein for instance a relay which is responsive to the state of charge of the storage condenser is provided to disconnect the oscillator in the D.C.-converter or transformer circuit from its operating potential. Accordingly, if the storage condenser has its desired potential value necessary for setting in the operating point of the flash circuit, the battery itself will be conserved, and a longer battery life will be attained.

The applicant has already suggested a circuit arrangement for electronic flash units with economy or battery conserving operation using transistor amplifiers and relay for the control circuit according to which a condenser of approx. 0.5 $\mu$f. is connected in parallel to the series connection of the glow lamp and the base resistance (economy operation) preventing a fluttering of the relay.

It has now been shown that the magnitude of this base resistance of the transistor for the control circuit is not always sufficient to attain a favourable regulation effect (economy operation). However, it is not possible simply to alter this base resistance of the transistor amplifier for the control circuit, i.e. this base resistance may not be made as large as desired since then the temperature dependence of the transistor amplifier would be impermissibly large.

Therefore, in accordance with the invention, the suggestion is made of inserting another resistance in series to the condenser fitted parallel to the series connection of the glow lamp and the base resistance of the transistor control circuit (economy circuit). This resistance acts practically as an enlargement of the base resistance of the transistor and ensures good operation of the control circuit.

Moreover, more exact investigations on the dimensioning of this series resistance gave the surprising result that, with quite definite, exactly defined resistance values, a kind of gain results in a desired, very limited control range obtained at which, however, there can be a saving in transistor amplification so that one single transistor is sufficient for the amplification circuit instead of two transistors with the same regulation values. On exceeding this critical value for this series resistance, the arrangement begins to oscillate but the adjustment of an absolutely stable operational point is possible and this is considerably independent of battery voltage and temperature.

Therefore, according to the further subject matter of the invention, this series resistance is made adjustable so that, in any case, the most favourable operational point of the control circuit can be set.

The circuit arrangement according to the invention is explained in detail on the basis of the example of embodiment shown in the diagram, in this case being a battery-fed electronic flash unit.

On switching on the switch 1, the voltage of the battery 2 is fed to the oscillating transistor 3 which charges up the storage condenser 5 via the transformer 4 and the rectifier 6. The voltage on the storage condenser 5 serves to feed the flash lamp 7 in that the voltage for the ignition circuit is tapped from the voltage divider consisting of the resistances 8, 9, 10 with the glow lamp 11 indicating sufficient charging voltage on the storage condenser 5. Accordingly, the voltage for the Tesla circuit with the transformer 13 and the ignition condenser 14 is tapped from the resistance 10. 15 is the synchronous contact which is led to the camera via the cable lead 16. The switch S is equal to the camera release button. On operating this button, the flash discharge of lamp 7 is released via the transformer 13. 12 is a protective resistance (contact protection).

The control or economy circuit is derived from the voltage divider (potentiometer 19). From the tap on this resistance 19, the tapped voltage is taken, via the glow lamp 18 and the base resistance 17 in series with this, to the base of the appertaining transistor amplifier 20 the output circuit of which contains the relay 21 with the contact 22. As soon as the voltage on the storage condenser 5 is sufficient, the glow lamp 18 starts to conduct and accordingly the bias voltage on the transistor 20 is affected so that current flows in the output circuit of the transistor and so the relay 21 breaks the contact 22 and the oscillating transistor circuit is broken and the oscillating transistor ceases to operate (economy operation).

The voltage for the transistors is taken from the battery 2 in connection with the voltage divider 25, 26, 27. 23 is a signal lamp showing that the unit is switched on and 24 is a by-pass condenser for improving the oscillating effect of the circuit of the oscillating transistor 3.

In accordance with the invention, the series connection of the condenser 28 to the adjustable resistance 29 lies parallel to the series connection of the glow lamp 18 and the base resistance 17 for the transistor amplifier 20 for the control circuit. By means of this "relaxation circuit," a stable operational point for the control circuit can be adjusted by regulating the tap on the resistance 29 so that this is considerably independent of the battery voltage and temperature. The most favourable values for this "relaxation circuit"—consisting of condenser 28 and the regulating resistance 29—are:

Condenser 28 approx. 0 to 2 $\mu$f., preferably 0.5 $\mu$f.

Regulating resistance 29 in the magnitude of 100,000 ohms.

What I claim is:

1. Electronic flash apparatus for photographic purposes, comprising: a low voltage battery, a voltage transformer having a low voltage primary winding and a high voltage secondary winding, first-circuit means including an oscillating transistor and connecting said low voltage battery to said low voltage primary to cause said primary winding to induce a high voltage in said secondary winding, an electrically operated current interrupting device for periodically interrupting the circuit connection of said oscillating transistor, said electrically operated current interrupting device being a relay connected to said battery so as to be energized thereby, a storage condenser, second-circuit means connecting said storage condenser to the secondary winding of said transformer, a flash lamp, further circuit means connecting said flash lamp to said storage condenser, means for causing said flash lamp to fire and said condenser to discharge through said lamp to thereby produce a flash of light, an amplifier having an input and an output circuit means connecting the input of the amplifier to said condenser, said current interrupting relay having an energizing winding and a contact element movable from a first to a second position upon energization of said winding, and means for connecting said battery and the output of said amplifier in series with said relay winding so as to energize the output of said amplifier from said battery, a control circuit for controlling said input circuit means dependent on said storage condenser's potential, and a potentiometer resistance connected in parallel to said storage condenser, said control circuit consisting of the series connection of a glow lamp and the biasing resistance of the input of said amplifier connected between the tap of said potentiometer resistance and the input of said amplifier, and further consisting of a series connection of a resistance and a condenser, which both are lying in parallel to said series connection of said glow lamp and said biasing resistance, so that the latter is energized as soon as the voltage of said storage condenser is sufficient to fire said glow lamp, thus affecting the output circuit means of said amplifier including said relay energizing winding, so that current is flowing through the energizing winding of said relay and said contact element is moved to a second position so as to interrupt the circuit connection of said oscillating transistor of said first-circuit means.

2. Electronic flash apparatus as claimed by claim 1, wherein the resistance of said second series connection is made variable.

3. Electronic flash apparatus as claimed by claim 1, wherein the condenser of said second series connection amounts to a value of approximately 0.1 to 2.0 μf. and the adjustable resistance of said second series connection amounts to a value of about 100,000 ohms.

References Cited by the Examiner

UNITED STATES PATENTS

| | | | |
|---|---|---|---|
| 2,935,650 | 5/60 | Rock | 315—241 |
| 2,977,524 | 4/61 | Lingle | 315—241 |

DAVID J. GALVIN, *Primary Examiner.*

GEORGE N. WESTBY, *Examiner.*